(12) United States Patent
Benuzzi

(10) Patent No.: US 8,151,677 B1
(45) Date of Patent: Apr. 10, 2012

(54) METHOD AND MACHINE FOR SAWING PANELS WITH LATERALLY MOVABLE PUSHER

(75) Inventor: Piergiorgio Benuzzi, Bologna (IT)

(73) Assignee: Giben International S.p.A., Bologna (IT)

( * ) Notice: Subject to any disclaimer, the term of this patent is extended or adjusted under 35 U.S.C. 154(b) by 0 days.

(21) Appl. No.: 09/367,244

(22) PCT Filed: Dec. 17, 1998

(86) PCT No.: PCT/IB98/02046
§ 371 (c)(1),
(2), (4) Date: Aug. 10, 1999

(87) PCT Pub. No.: WO99/33600
PCT Pub. Date: Jul. 8, 1999

(30) Foreign Application Priority Data

Dec. 24, 1997 (IT) .................................. BO97A0740

(51) Int. Cl.
*B26D 5/20* (2006.01)
*B26D 7/06* (2006.01)

(52) U.S. Cl. ................ 83/206; 83/226; 83/412; 83/250; 83/451; 83/474; 83/953; 83/404; 83/418; 83/422; 83/425

(58) Field of Classification Search ................ 83/36, 35, 83/39, 42, 43, 206, 207, 226, 251, 227, 277, 83/409.1, 412, 418, 454, 452, 220, 250, 477.2, 83/491, 451, 474, 953, 404; 198/470.1, 468.9, 198/468.6, 456
See application file for complete search history.

(56) References Cited

U.S. PATENT DOCUMENTS

| | | | | |
|---|---|---|---|---|
| 3,174,747 A * | 3/1965 | Friedland et al. | ............... | 83/419 |
| 3,758,099 A * | 9/1973 | Scott | ............... | 83/461 |
| 3,890,862 A * | 6/1975 | Lhenry | ............... | 83/36 |
| 4,274,801 A * | 6/1981 | Herb et al. | ............... | 414/751 |
| 4,297,927 A * | 11/1981 | Kuroda | ............... | 83/36 |
| 4,317,397 A * | 3/1982 | Ess | ............... | 83/35 |
| 4,348,924 A * | 9/1982 | Jenkner | ............... | 83/39 |
| 4,392,401 A * | 7/1983 | Ess | ............... | 83/36 |
| 4,515,050 A * | 5/1985 | Haenni et al. | ............... | 83/76.6 |
| 4,519,284 A * | 5/1985 | Hunter et al. | ............... | 83/410 |
| 4,523,749 A * | 6/1985 | Kindgren et al. | ............... | 269/32 |
| 4,588,070 A * | 5/1986 | Smith | ............... | 198/468.3 |
| 4,602,541 A * | 7/1986 | Benzinger et al. | ............... | 83/36 |

(Continued)

FOREIGN PATENT DOCUMENTS

DE 26 34 487 A1 2/1978

(Continued)

*Primary Examiner* — Boyer D Ashley
*Assistant Examiner* — Omar Flores Sanchez
(74) *Attorney, Agent, or Firm* — Fay Sharpe LLP

(57) ABSTRACT

A panel sawing machine comprises a horizontal table (5) on which a movable device (6) pushes a stack of panels (3a) in a forward direction (F) or reverse direction (F1) to feed a sawing device (or to a device for rotating the stack) which divides the panel up into two or more smaller boards. The pusher (6) is equipped with two or more pickup elements (16) that hold the rear edge of the stack in position during positioning and/or sawing operations. The pickup elements (16) are mounted on the movable device (6) in such a way that they can run in guides (15, 15a, 15b) in the following three directions, respectively: horizontal at right angles to, and horizontal parallel to, the forward direction (F) or the reverse direction (F1), and vertical.

4 Claims, 15 Drawing Sheets

U.S. PATENT DOCUMENTS

| | | | | |
|---|---|---|---|---|
| 4,612,966 | A | * | 9/1986 | Jenkner ................ 83/36 |
| 4,621,552 | A | * | 11/1986 | Lopez ................ 83/27 |
| 4,638,904 | A | * | 1/1987 | Randar et al. ............ 198/468.2 |
| 4,694,871 | A | | 9/1987 | Jenkner |
| 4,726,724 | A | | 2/1988 | Jenkner |
| 4,985,971 | A | * | 1/1991 | Kitamura ............ 29/33 P |
| 5,007,317 | A | * | 4/1991 | Jenkner ............ 83/39 |
| 5,137,399 | A | * | 8/1992 | Blaimschein ............ 409/80 |
| 5,205,705 | A | * | 4/1993 | Jenkner ............ 83/39 |
| 5,311,799 | A | * | 5/1994 | Mohr ............ 83/36 |
| 5,339,128 | A | * | 8/1994 | Tateyama et al. ........... 396/604 |
| 5,400,652 | A | * | 3/1995 | Haar ............ 83/206 |
| 5,571,325 | A | * | 11/1996 | Ueyama et al. ............ 118/320 |
| 5,667,351 | A | * | 9/1997 | Tokairin et al. .......... 414/226.02 |
| 5,701,791 | A | * | 12/1997 | Schulze et al. ............ 83/277 |
| 5,919,529 | A | * | 7/1999 | Matsumura ............ 427/398.1 |
| 6,029,555 | A | * | 2/2000 | Naldi ............ 83/451 |
| 6,145,424 | A | * | 11/2000 | Matsuda et al. ............ 83/227 |

FOREIGN PATENT DOCUMENTS

| | | |
|---|---|---|
| DE | 37 32 556 A1 | 4/1988 |
| DE | 41 16 486 A1 | 12/1994 |
| EP | 0 184 642 A1 | 6/1986 |
| EP | 0 200 120 A2 | 11/1986 |
| FR | 2694516 * | 8/1992 |

* cited by examiner

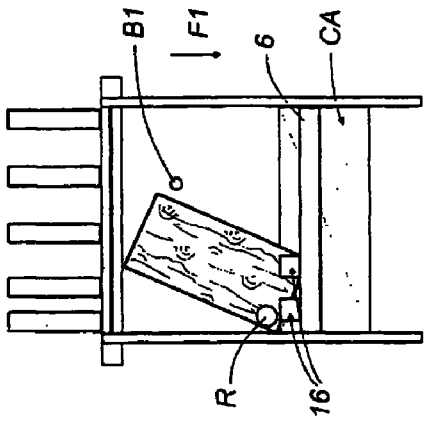
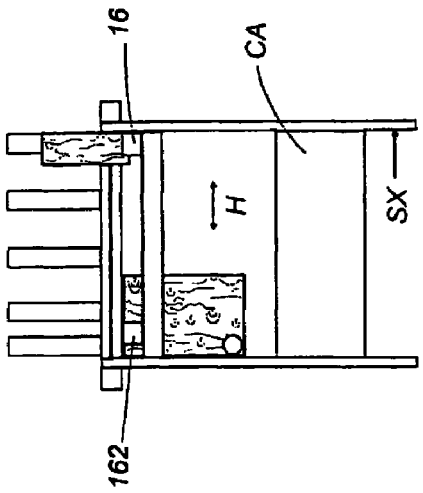
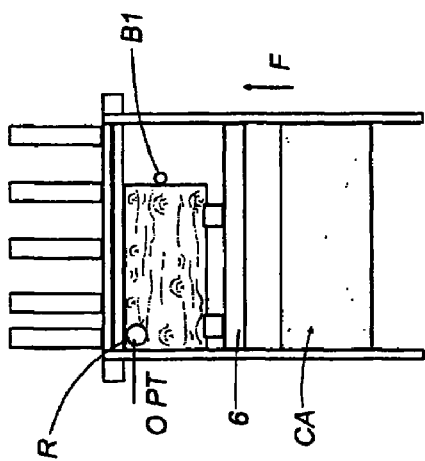
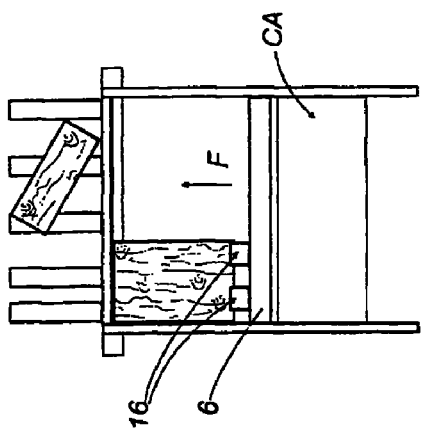
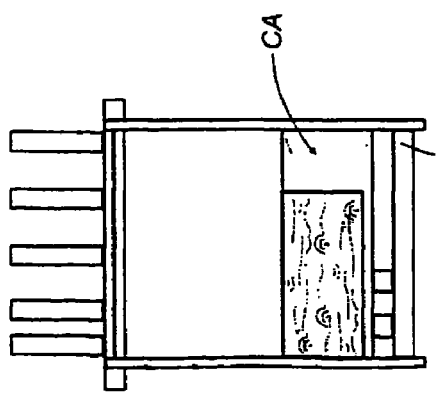
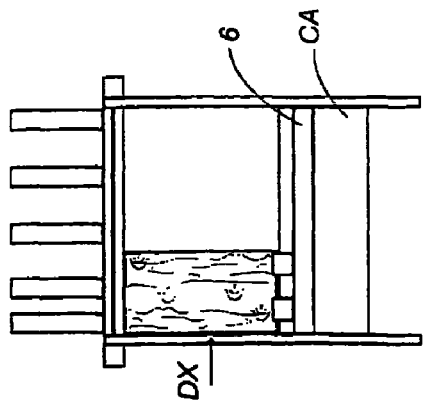

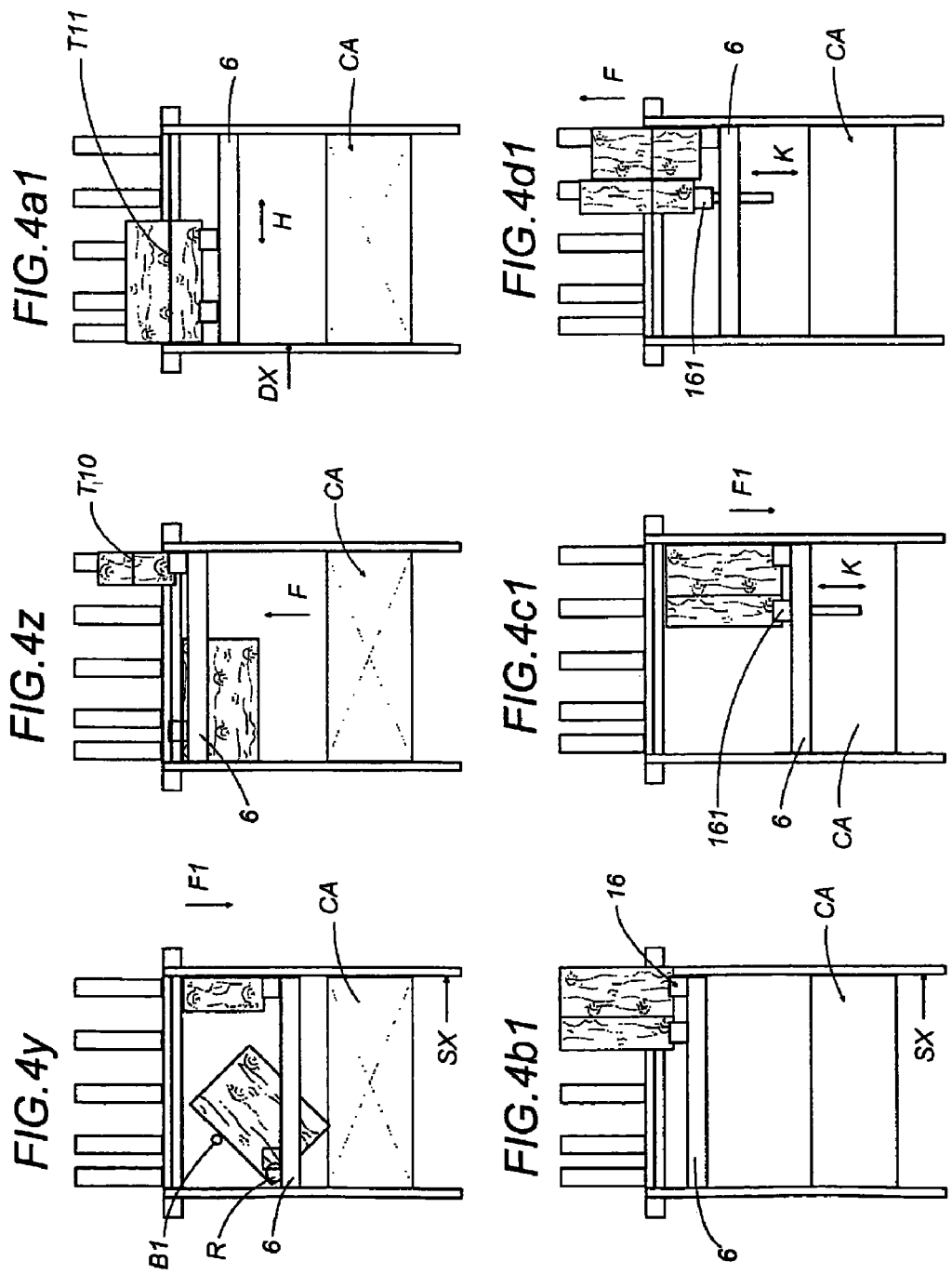

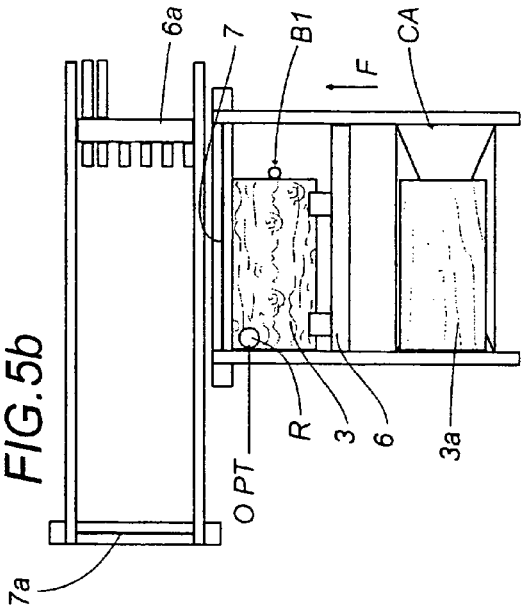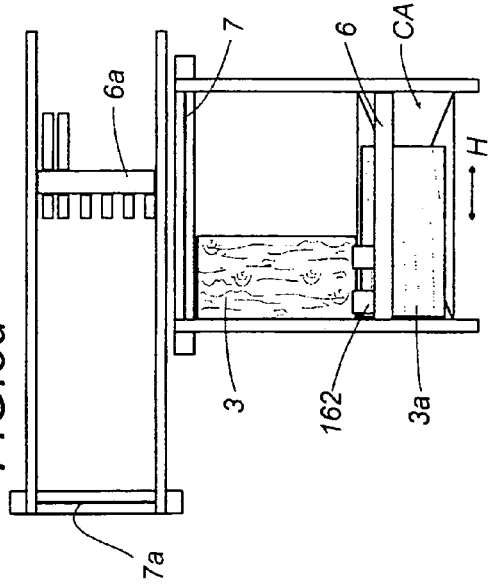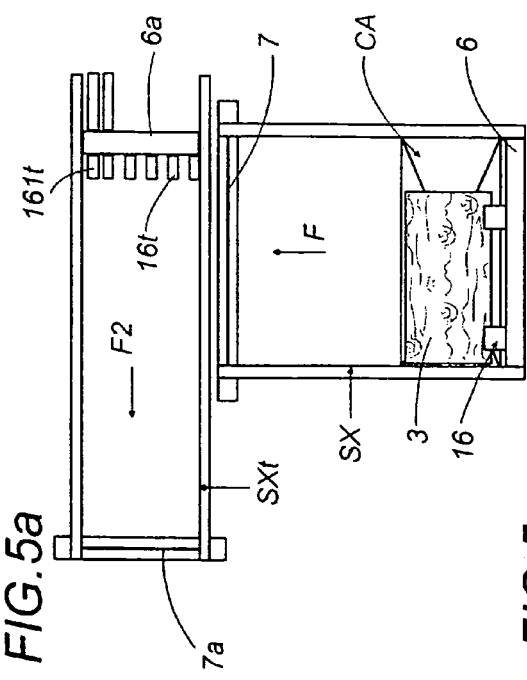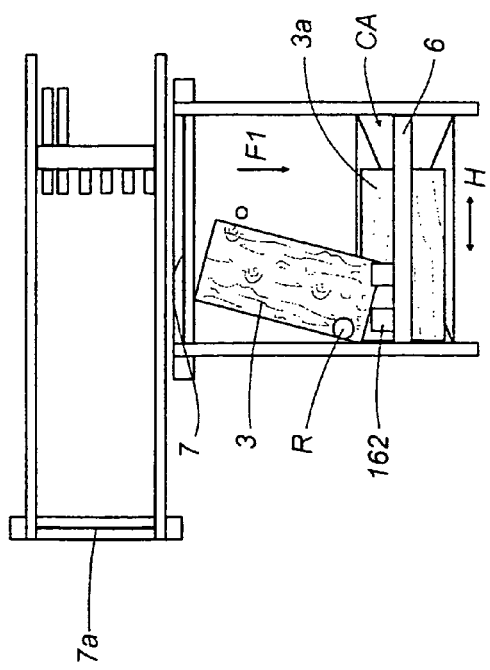

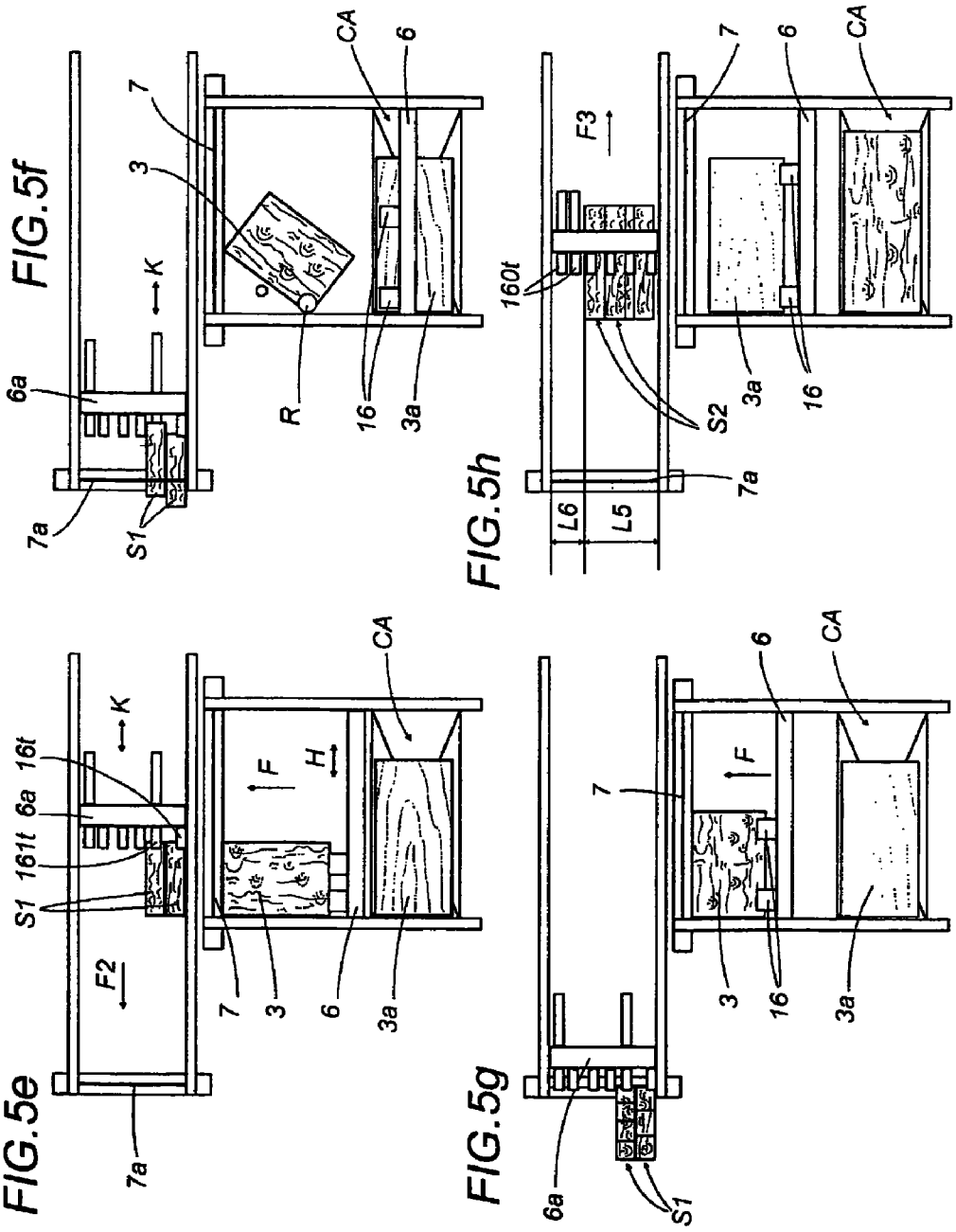

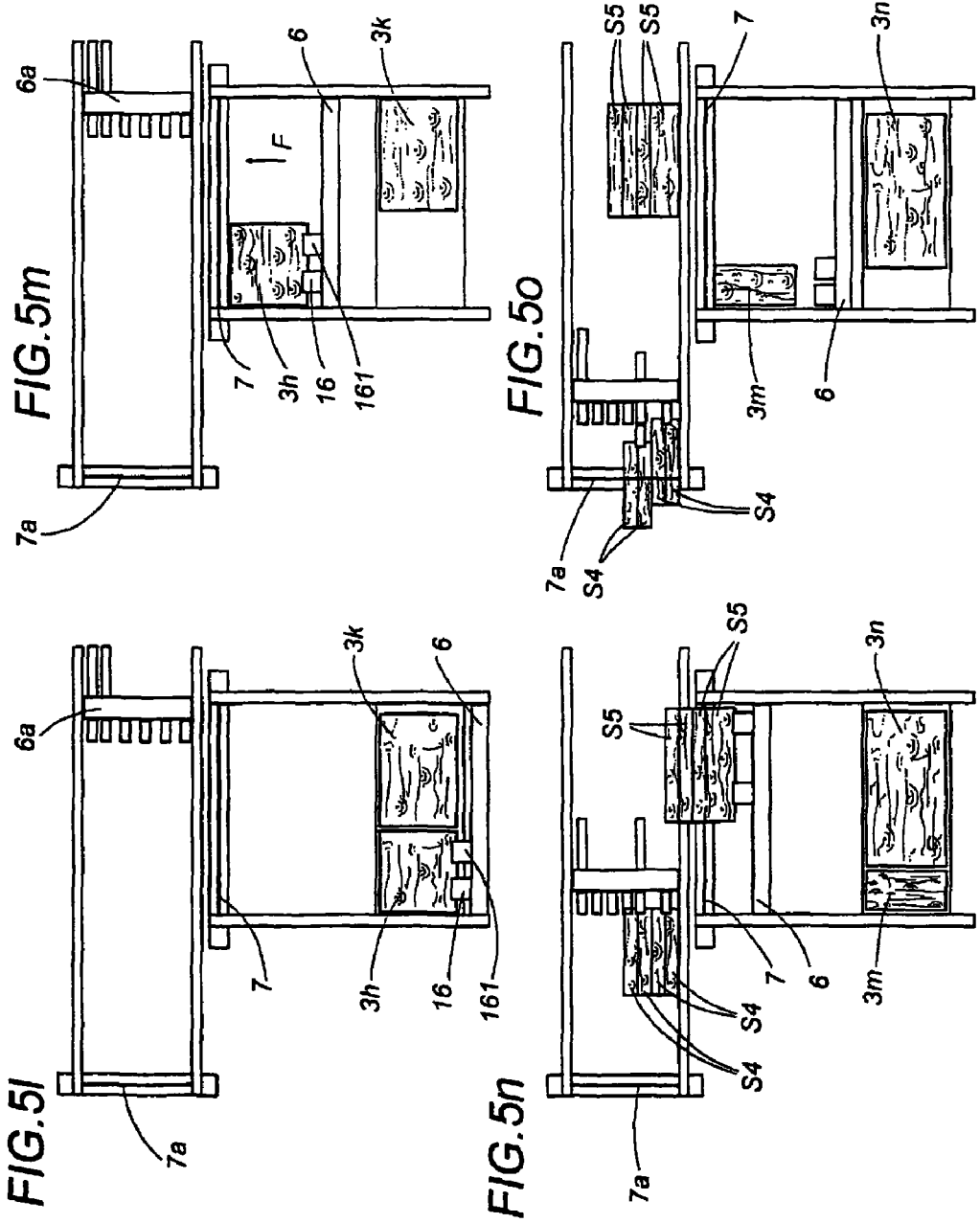

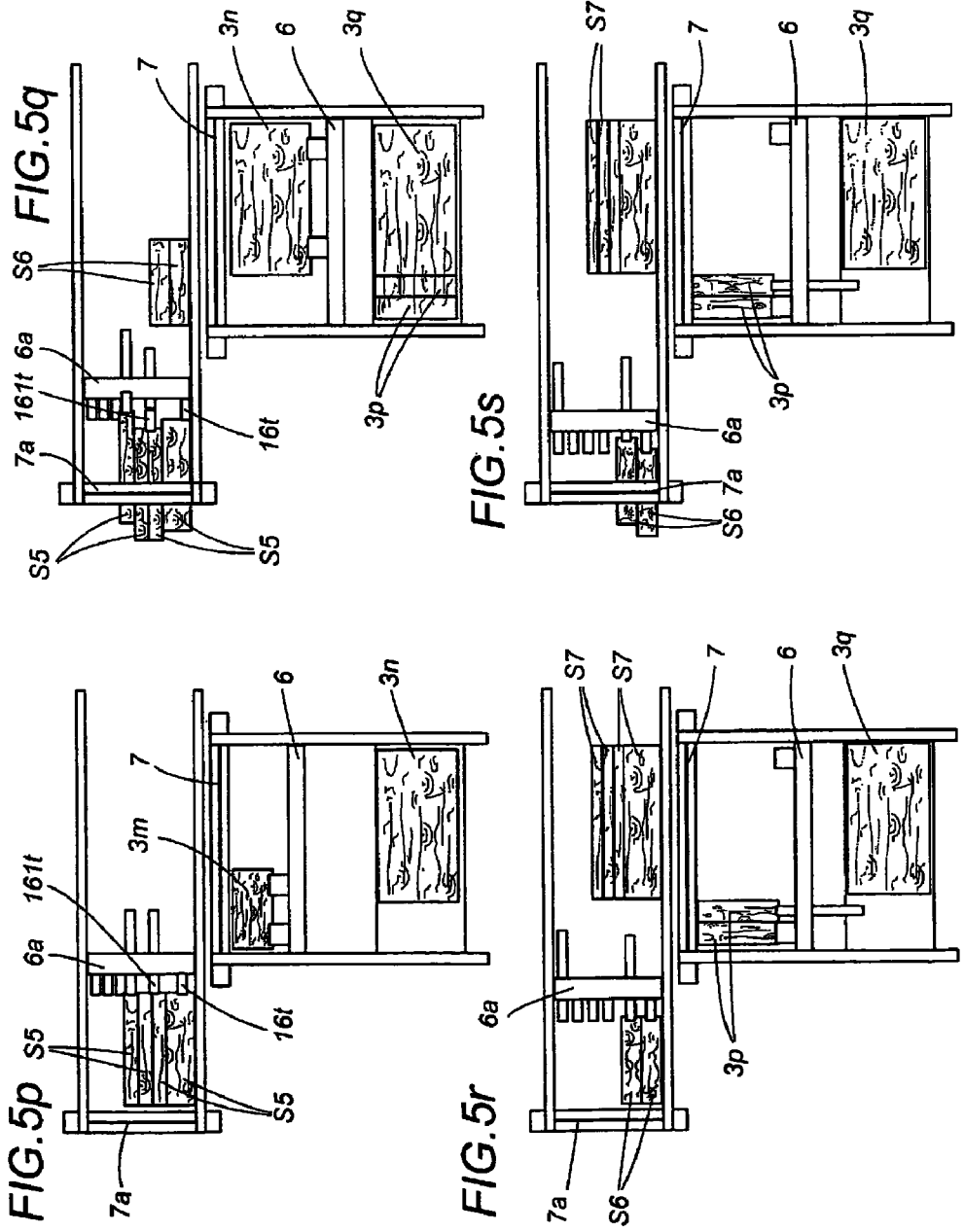

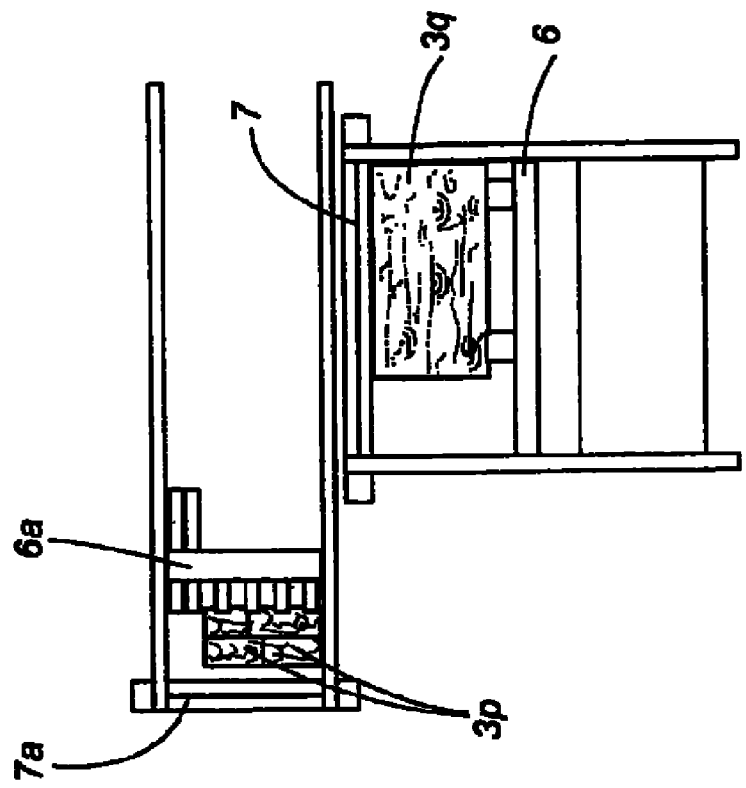
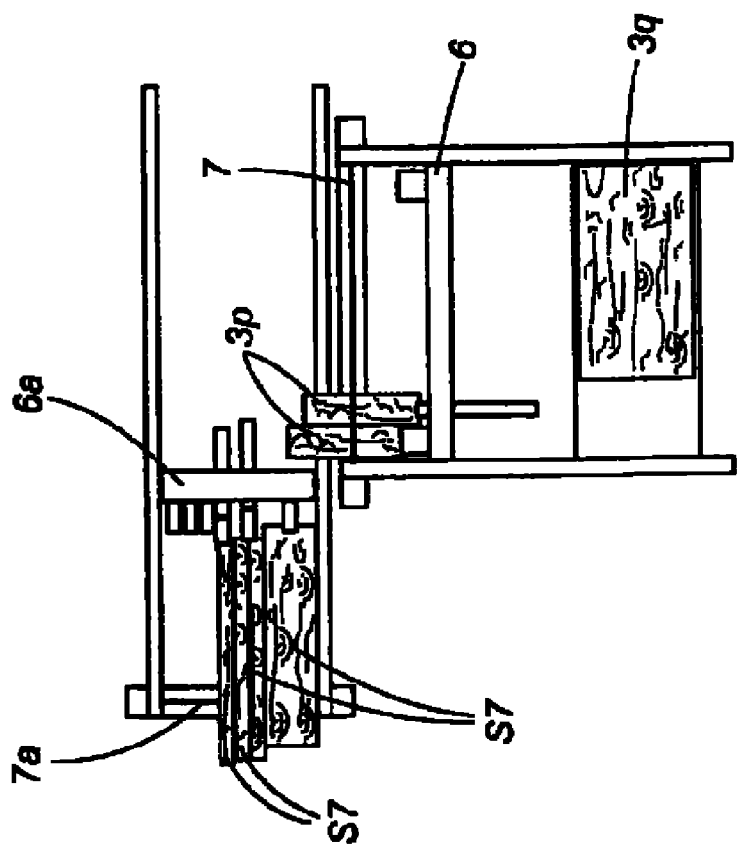

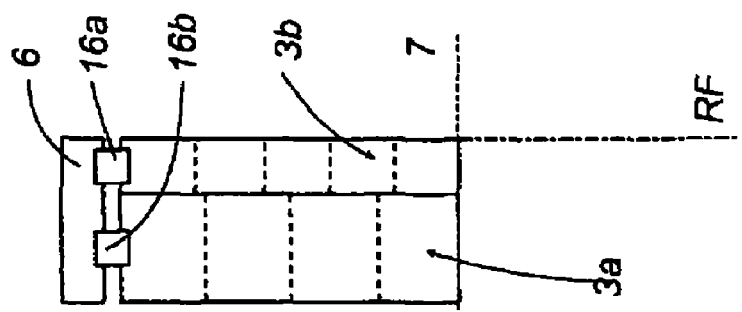
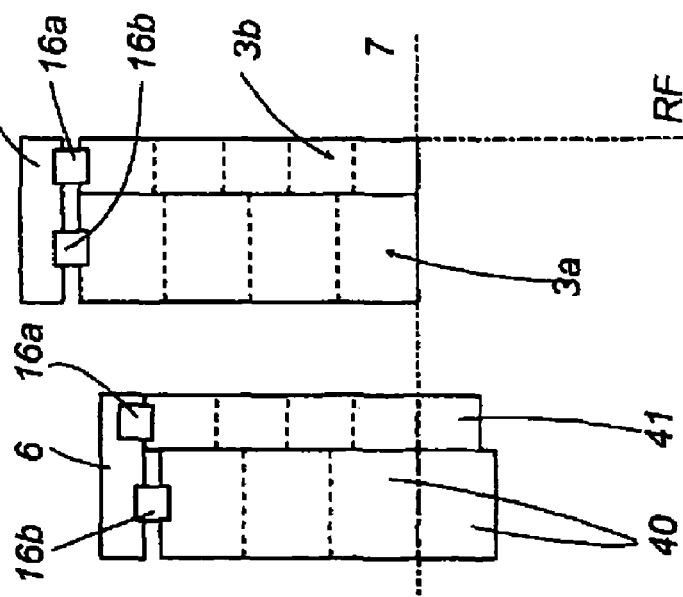
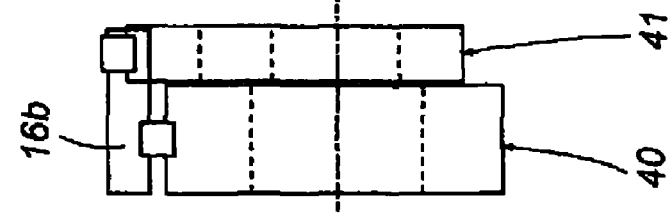
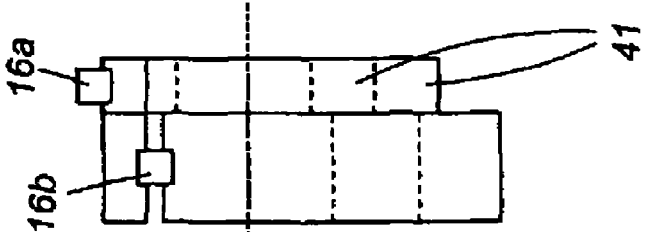
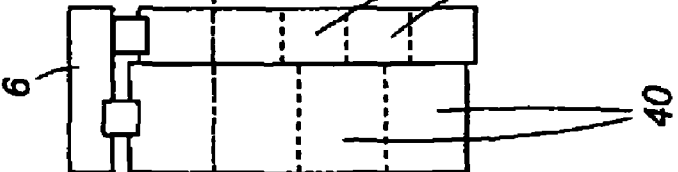
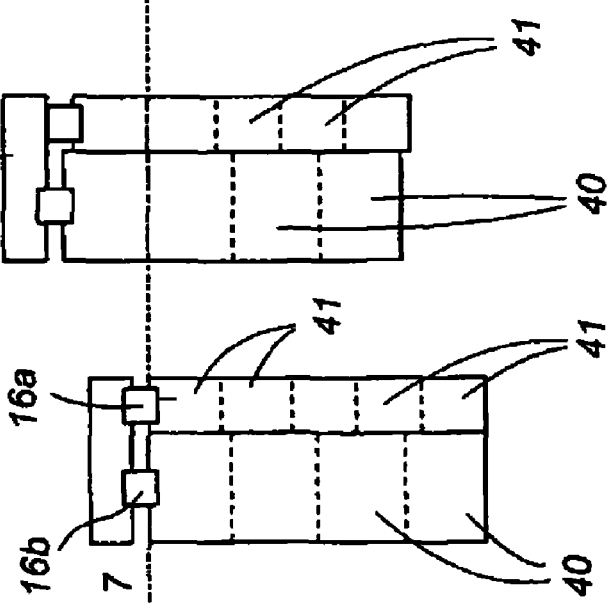

METHOD AND MACHINE FOR SAWING PANELS WITH LATERALLY MOVABLE PUSHER

TECHNICAL FIELD

The present invention relates to a panel sawing machine. The invention can be used in particular, but not solely, to cut panels, slabs or sheets made especially of wood-based materials but also of plastic, light metal alloys, steel and composite and mineral-bonded board, in order to form smaller boards.

The invention applies in particular to machine for sawing wood-based materials and comprising a horizontal table on which a movable device, usually known as pusher, can push at least one panel to a device downstream for sawing (or rotating) the panel, where, during the sawing operation, the panel is positioned by suitable pickup elements which grip the rear edge of the panel, and including any additional positioning, aligning, outfeed, pressing and rotating elements that constitute the standard equipment of these machines.

BACKGROUND ART

Known machines of this kind are normally equipped with a plurality of pickup elements, for example of the gripper type, mounted side by side in a given direction at right angles to the forward (or reverse) feed direction of the panels and acting on the rear edge of the panels to be cut.

These known panel sawing machines are used to cut panels of various sizes, both in width and length, usually placed one over the other in normally large stacks whose dimensions depend on the size of the panels made by the panel forming machines.

Conventional panel sawing machines may be of the simple type, with a single cutting axis, called lengthways axis, located downstream of the pusher, or more complex, with two (or more) cutting axes at an angle to each other and with panel feed tables positioned at 90° to each other. In these more complex machines, the cutting axes are downstream of the corresponding pushers, the first axis being called the lengthways axis and the second, the crossways axis.

In these known machines, the same pusher can also be used to saw two or more stacks of panels or boards in succession. In addition, stacks of different sized boards placed side by side can only be sawn simultaneously if the cutting line of the different stacks corresponds with the machine cutting axis concerned (creating what is usually known as a logical cutting pattern). If the cuts are not consistent (creating differentiated cutting patterns) several pushers may be provided, each acting on one (or more) board/boards or portion of panel and resulting in constructional complications and additional costs for the entire machine.

Depending on the size (whether initial or derived from pre-cuts) of the stack of panels or group of boards to be sawn, the machine must be equipped with a suitable number of pickup elements appropriately positioned and distributed along the entire rear edge of the related stack or group of boards so as to firmly hold the panels along the entire width and to line them up securely against a stop surface during the sawing operation.

One of the disadvantages of known panel sawing machines is that all of them are set up and equipped to cut a limited number of sizes of panel stacks or groups of panel stacks. This is accomplished by mounting on the pusher crossbeam a variable number of pickup elements or grippers, depending on the requirements of the end user. In other words, the manufacturer equips the pusher crossbeam with a number of pickup elements or grippers, variously distributed along the length of the beam, at fixed positions, using the smallest number of elements possible in order to reduce costs.

These machines are therefore rather inflexible in terms of size changeover and hence are not suitable for cutting panels of many different sizes unless fitted with complex equipment, which considerably raises construction costs and requires expensive tooling; not to mention the fact that, although machines of this kind are long-term investments, its capabilities are unable to satisfy process requirements after many years in operation, not least because of the diverse and constantly changing market requirements.

DISCLOSURE OF THE INVENTION

The present invention has for its principal object to overcome the disadvantages of prior art by providing a panel sawing machine, with either one or two (or more) cutting axes, that can be adjusted in an extremely simple and practical manner to work on panels or boards or groups of boards of any size.

One advantage of the present invention is that it permits two or more panels and/or boards in stacks placed side by side to be cut lengthways or crossways (depending on which machine axis is being used) even if the adjacent panels and/or boards must be sawn into smaller boards or panels differing in length and width from one panel or board to the next.

Another advantage is that it provides a machine that can be used to make boards of various sizes both in width and length with a relatively small number of cutting operations and allowing considerable saving of time.

The above mentioned aims and advantages are all achieved by the present invention as characterized in the claims below.

Other characteristics and advantages of the invention are made more apparent in the detailed description which follows, with reference to the accompanying drawings, which illustrate a preferred embodiment of the invention and in which.

Figure 1:
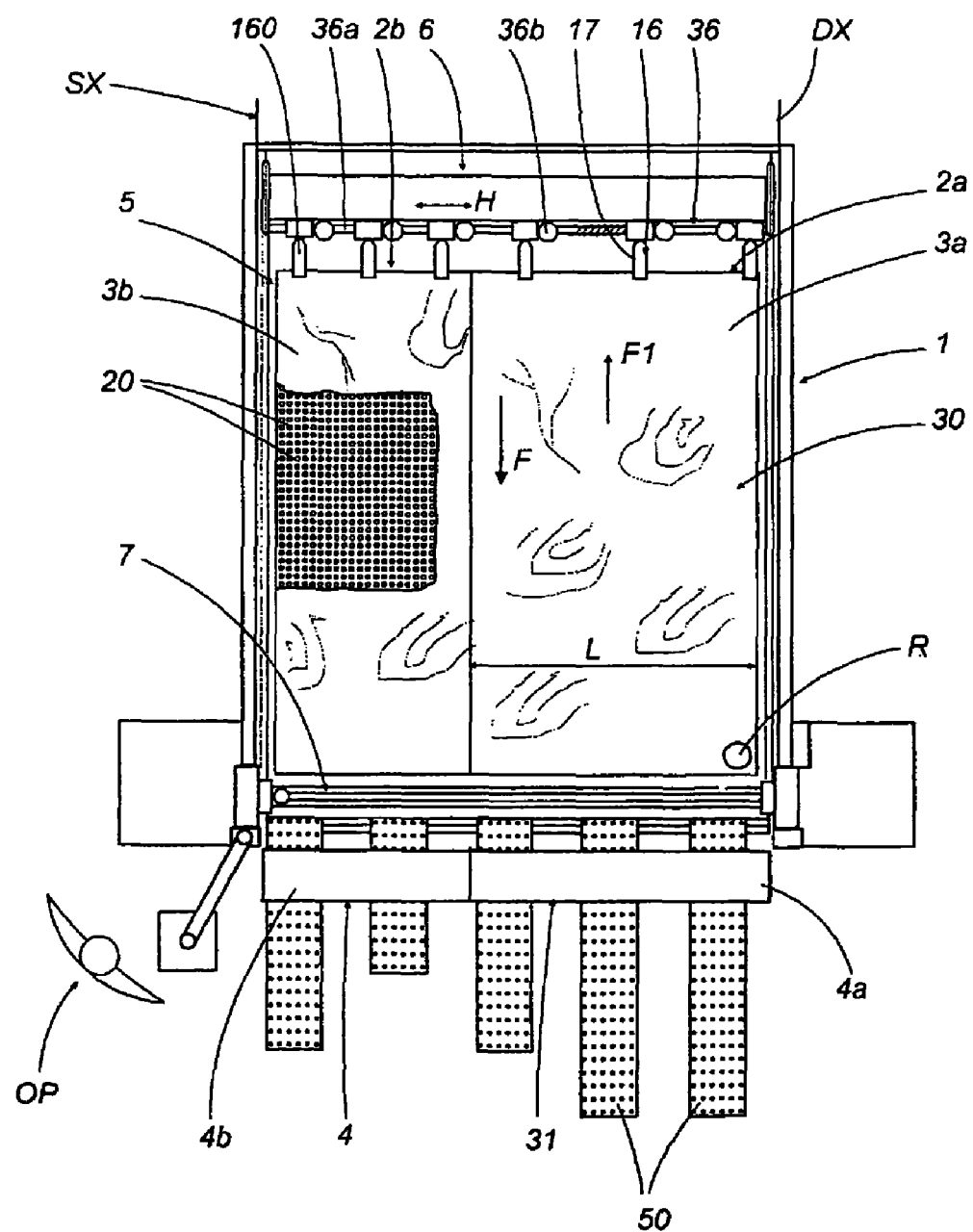
FIG. 1 is a schematic top plan view of a machine made in accordance with the present invention and being of the type with a single, lengthways cutting axis.
Figure 4A:
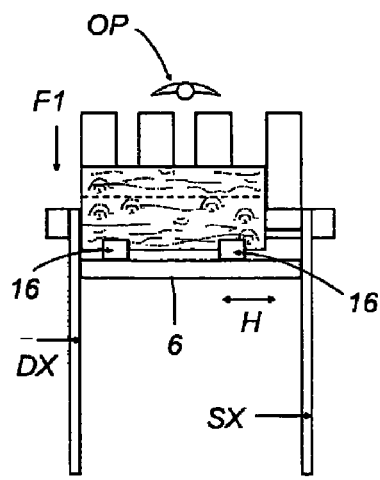
Figure 4B:
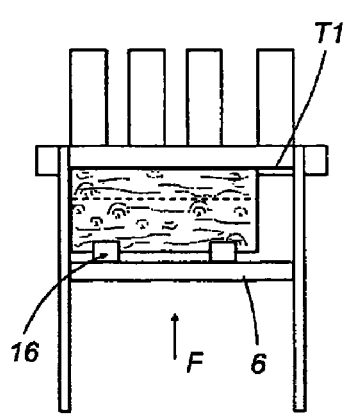
Figure 4C:
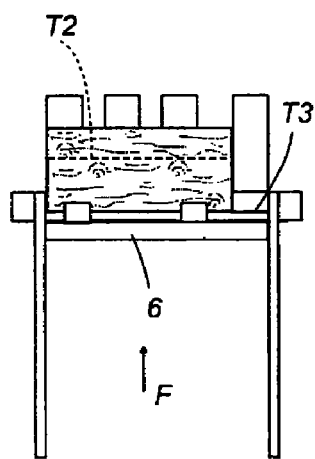
Figure 4D:
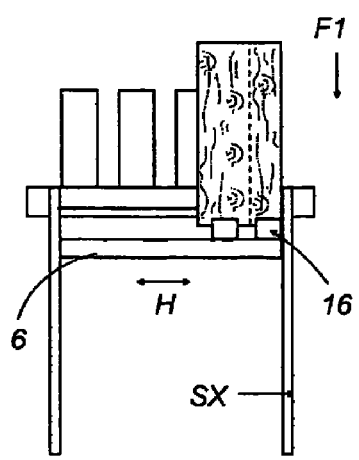
Figure 4E:
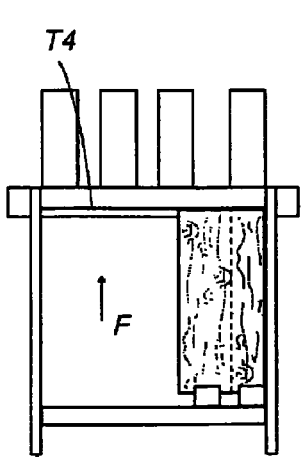
Figure 4F:
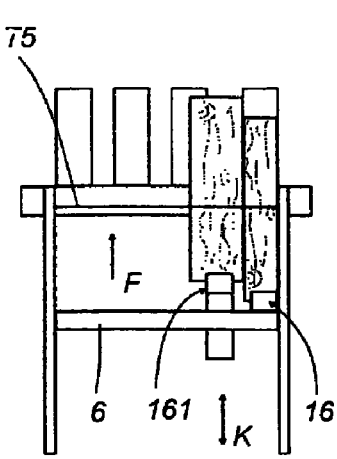
Figure 4G:
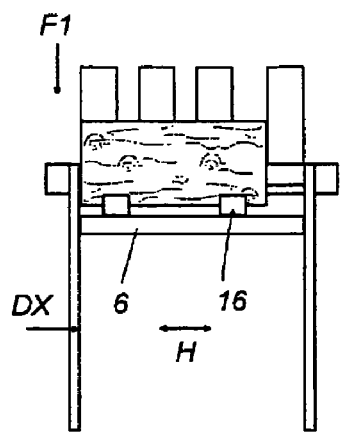

FIGS. 4a to 4d1 are schematic top views of possible working configurations of the machine illustrated in FIG. 1, differing according to the size of the panels to be cut and the characteristics of the machine itself;

FIGS. 5a to 5u are schematic top views of possible working configurations of a machine with two (angular) cutting axes, differing according to the size of the panels to be cut and the characteristics of the machine itself.

FIGS. 6a to 6f are schematic top views of different stages in the cutting operations that can be carried out with the machine disclosed by the present invention.

With reference to FIG. 1, the numeral 1 indicates as a whole a panel sawing machine with a single, lengthways cutting axis used normally to cut whole panels 30 of large size (such as that illustrated) or panels 3a and 3b placed side by side. In the present description, reference is made to the cutting of panels made of wood or from a wood-based material but without thereby restricting the scope of the invention.

The machine 1 is designed to cut panels 30 or 3a, 3b into smaller boards 31 or 4a, 4b, respectively, having the same or different width L.

The machine 1 comprises a horizontal table 5 that supports at least one panel to be cut. The table is made in such a way as to permit the panel to easily slide on it in a forward feed direction, indicated by the arrow F, or in the opposite direction F1, in the case of a panel or stack of panels fed from the machine front/operator side OP (as described in more detail below). In this particular case, the table 5 is loaded by conventional feeding and loading means (not illustrated) with one or more stacks of panels. By way of example, FIG. 1 shows two stacks 2a and 2b of panels placed side by side, which, alternatively, might constitute a single stack 2 (see FIG. 2) not larger in size than the sum of the dimensions of the stacks 2a and 2b.

Figure 2:
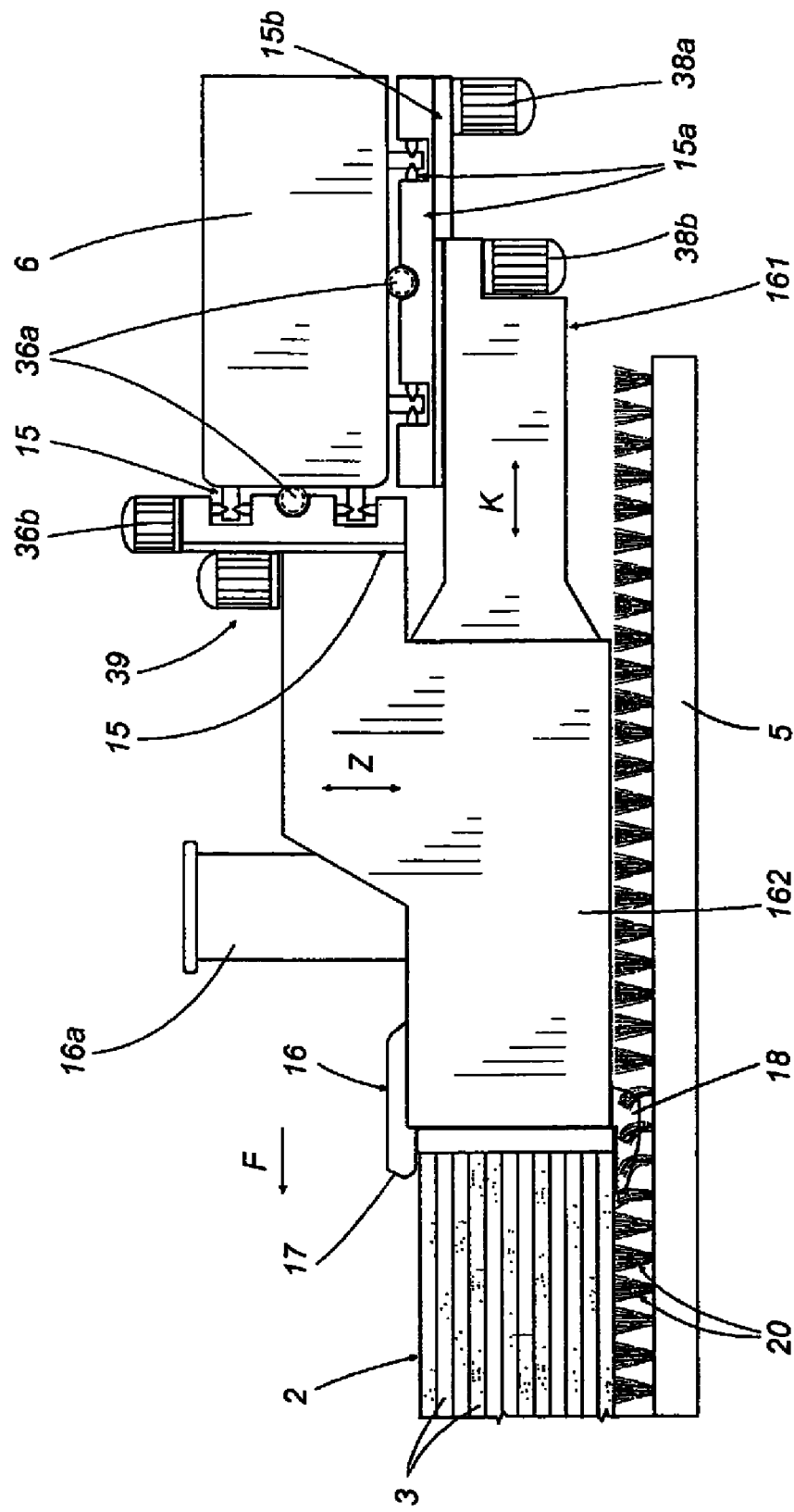
FIG. 2 is a scaled-up, right-hand side view of a detail of FIG. 1.

The panel table might, for example, comprise a plurality of idle rollers turning about axes perpendicular and/or parallel to the feed direction or, in another preferred embodiment, illustrated in FIG. 2, the table may comprise a plurality of brush-like supporting elements 20 (either low-friction fibre or air-cushion), the tops of which form a horizontal surface on which the panels can slide. The table may also be equipped with a rotation device, illustrated schematically and labelled R, which, when necessary, turns the panel through 90°, as described in more detail below with reference to the illustrations showing the different process stages. In the most simple embodiment, the rotation device may consist of a gripper which grips a corner of the panel and moves in direction F, F1 so as to turn the panel.

The machine is equipped with means for moving the panels along the table 5 in the feed direction F or F1, said means comprising a movable device 6 designed to push the panels 3 or 3a, 3b along the table 5 in direction F (or to pull them in direction F1) towards a lengthways sawing device 7 designed to divide the panels into smaller boards. The pusher 6 consists essentially of a crossbeam able to move in the feed direction F (or F1) in steps of preset length in such a way as to feed stacks 2 or 2a, 2b of panels to the sawing device 7. During stops between one step and the next, the sawing device 7 cuts the stacks of panels at right angles to the feed direction F.

The numeral 50 indicates air-cushion tables located on the operator side OP and designed to support and receive the panels feeding into or out of the sawing device 7. The letters SX and DX indicate the zero reference lines for the left-hand and right-hand sides of the machine, respectively.

The boards 4 or 4a, 4b feeding out of the sawing device 7 are then transferred to further process stations which are not illustrated in the drawings.

The pusher 6 has at least one pickup element 16 designed to hold the panels in position during the sawing operation. Each pickup element 16 acts on a part of the rear edge of a panel and prevents the edge from moving while the panel is being sawed.

The device 6 is preferably equipped with a plurality of pickup elements (as illustrated in FIG. 1) placed side by side in a horizontal direction at right angles to the panel feed direction. Each pickup element may, for example, comprise a gripper consisting of a first clamping part 17 designed to press down on the edge of the panel at the top of the stack and a second clamping part 18 which acts on the lower edge of the panel: in this case, the clamping parts 17 and 18 work together to form two jaws that hold the entire stack by its rear edge.

The clamping parts 17 and 18 are actuated by conventional drive means, illustrated schematically in FIG. 2, such as a fluid drive unit 16a.

FIG. 1 shows a plurality of pickup elements 16, irregularly spaced apart in a direction at right angles to F. In the case illustrated here, the distribution of the elements is more concentrated on the left-hand side, which is the reference side SX for the sawing of the stack of panels, although the right-hand reference side DX could also be used, as described below. Preferably, for the convenience of modular construction, all the pickup elements are identical.

According to the present invention, at least one of the pickup elements 16 (or better still, all of them except the first from the left, labelled 160) must be mounted on the pusher 6 in such a way as to be able to move crossways in both directions, in a horizontal direction indicated by an arrow H in FIG. 1, at right angles to the direction of feed.

This could be achieved by a sliding fit between the pickup element 16 and a first straight, horizontal guide 15, integral with the pusher 6 and schematically represented in FIG. 2.

Means, illustrated schematically in FIG. 1 and labelled 36, are also envisaged for controlling the left and right crossways movements of the different pickup elements 16. These control means may, for example, consist of a helical guide 36a, integral with the crossbeam 6 and engaged by a power-driven unit, labelled 36b, operated by a lead screw and integral with each pickup element 16. These control means are computerized and designed to locate the pickup elements along the rear edge of a panel at the positions most suitable to ensure a safe and secure hold on the panel, however wide the latter is and whatever its crossways position relative to the table.

In this regard, FIGS. 3a to 3f schematically illustrate six different positions that may be assumed by two pickup elements 16 according to the number and size of the panels 3 to be sawed. In practice, by appropriately positioning a relatively small number of pickup elements 16 (in this case, only two) in a crossways direction, panels 3 of any size can be held in position while they are being sawed.

Thanks to this controlled positioning solution, only a few elements 16 are needed to securely hold two or more panels placed side by side, to be sawed at the same time by the same sawing device or sets of different sized panels fed in one after the other. That makes for a practically universal machine that can be used for panels of any size and that can be controlled by an operator (or by a control system capable of recognizing panel dimensions) through simple setting operations that require very little time and hence result in negligible down time.

FIGS. 3a to 3f are simple illustrations of how panels of different sizes can be handled using only two pickup elements, which is the minimum number of elements required.

Figure 3A:
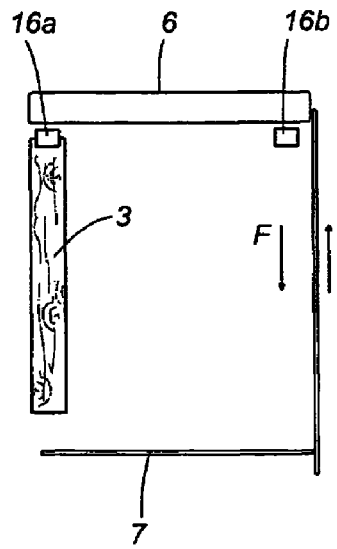
FIGS. 3a to 3f are schematic top views of possible cutting configurations using two grippers in accordance with the present invention.
Figure 3B:
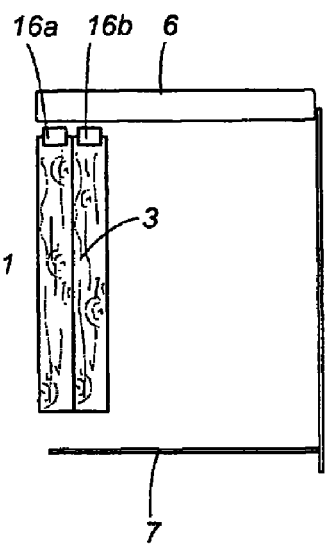
Figure 3C:
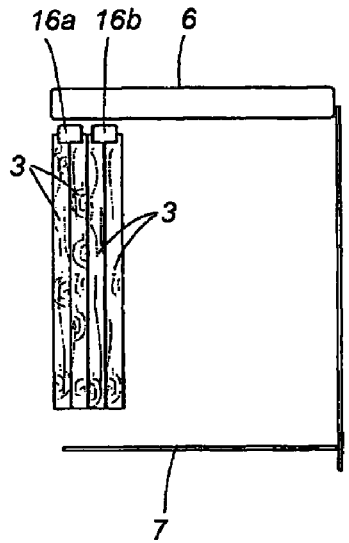

FIGS. 3a to 3c show some possible working configurations of the grippers on the pusher 6 that differ according to the width of the boards to be cut: notice that the grippers are located at the positions most suited to the width of the board or stack of boards.

In the case of a single board, as shown in FIG. 3a, gripper 16a alone is sufficient, while in the case of two boards 3 side by side, as shown in FIG. 3b, the gripper 16b must also be used. Similarly, in the example illustrated in FIG. 3c, where each of the grippers 16a, 16b is used to hold two (or more) thinner half-boards, the size and carrying capacity of the grippers are such as to enable more than one board (FIG. 3c shows two) to be simultaneously pulled in direction F1 or pushed in direction F.

Figure 3D:
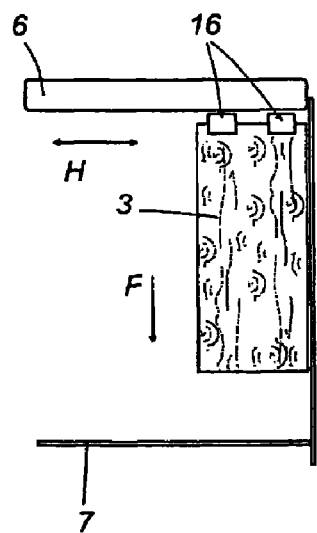
Figure 3E:
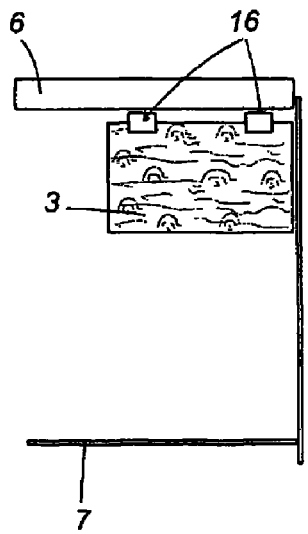
Figure 3F:
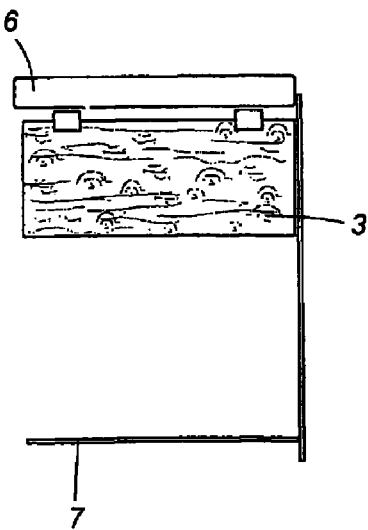

FIGS. 3d to 3f, on the other hand, show the grippers on the pusher 6 positioned differently according to the different sizes of a single large panel 3. Again, notice that the grippers are located at the positions most suited to the dimensions of the panel or stack of panels both in the lengthways direction (FIGS. 3e, 3f) and in the crossways direction to enable them to be pre-cut (see FIG. 3d).

Another feature of the invention is that at least one of the pickup elements 16, the one labelled 161 in FIG. 2, may move not only crossways relative to the pusher 6, in direction H, but also lengthways in the both the forward or reverse feed directions, labelled K. The pickup element 161 is preferably positioned below the crossbeam 6, for structural reasons to enable it to move to the different positions, as described in more detail below. It moves in H by means of a second guide 15a and in K by means of a similar third guide 15b, each having a corresponding drive unit, also of known type, and represented conventionally as 38a and 38b.

There may be one or more pickup elements 161 able to make controlled movements in direction K, in which case each pickup element 161 must be equipped with drive means allowing it to move independently of the others.

FIG. 2 shows that one or more of the elements 16, in this case labelled 162, may also move in a vertical direction Z along a fourth guide 15 and actuated by drive means 39: that means that the gripper concerned can be raised from the table so that the pusher crossbeam can return to the ready, retracted position by moving over the panel or stack of panels still being machined without touching it. This feature is described in more detail below.

The forward and return movements of the pickup elements 16, as well as their sideways and vertical movements along the three axes H, K and Z are controlled by a conventional, computerized controller unit (not illustrated) which drives all the machine axes.

Different working configurations that can be obtained with the machine described above will now be described with the aid of the schematic drawings of FIG. 4.

In FIGS. 4a to 4f, the process cycle of the panel sawing machine envisages a single, lengthways cutting axis with loading of panels (or stacks of panels, from now on called just panels for convenience) from the front, that is, from the operator side OP. The grippers (see FIG. 4a) are moved into position so as to be regularly spaced out in H along the length of the panel, referenced to the right-hand zero line DX: once the grippers 16 have got hold of the panel, the pusher moves back in direction F1. In FIG. 4b, the pusher crossbeam pushes the panel in direction F for a first trimming cut T1, a second lengthways cut (at least one) T2 and a final trimming cut T3 (see FIG. 4c). In FIG. 4d, after the operator OP has turned the boards resulting from the cutting of the panel, the pusher moves back in direction F1 and the grippers have moved to the new position to hold the boards (in this example, there are two boards), this time referenced to the left-hand line SX. The pusher (see FIG. 4e) pushes the boards to the first trimming cut T4 in direction F and then, see FIG. 4f, continues moving forward in direction F so that at least one crossways cut T5 can be made: in this case, however, one or more of the grippers (in this illustration, only the one labelled 161) must also move in direction K so as to allow different positions relative to the pusher crossbeam 6 which continues to move in direction F.

Figure 4H:
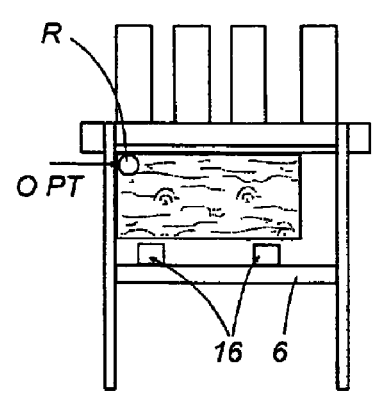
Figure 4I:
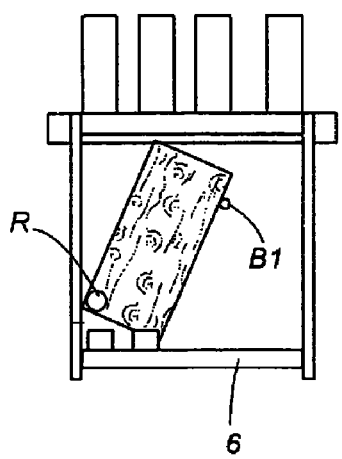
Figure 4J:
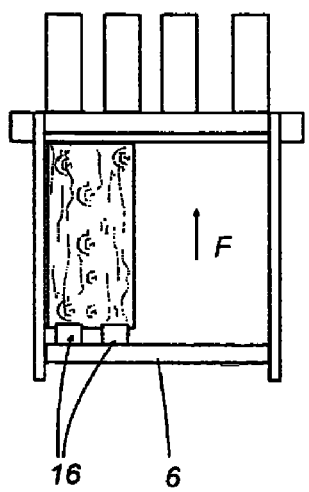
Figure 4K:
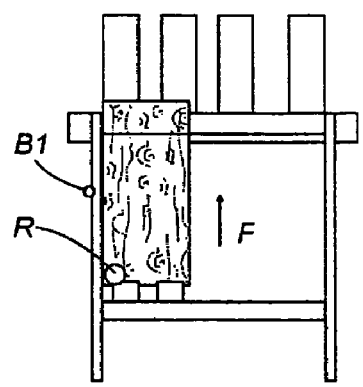
Figure 4L:
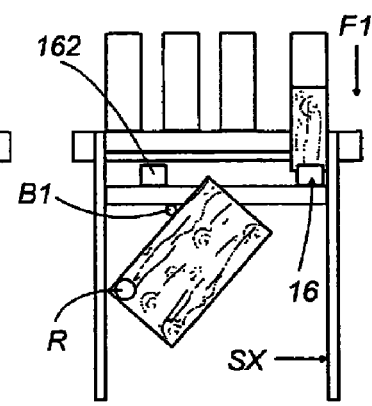
Figure 4M:
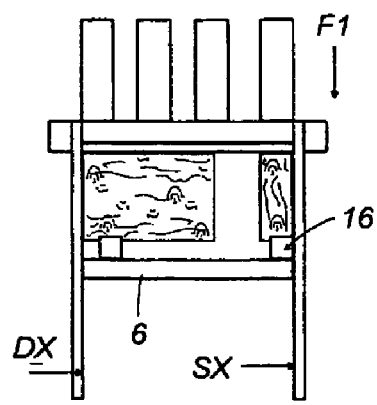
Figure 4N:
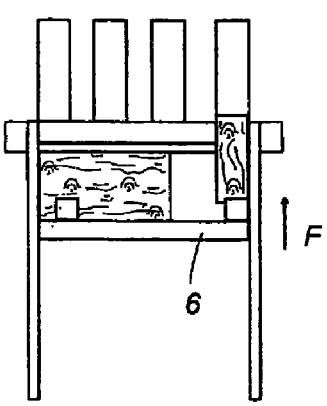
Figure 4O:
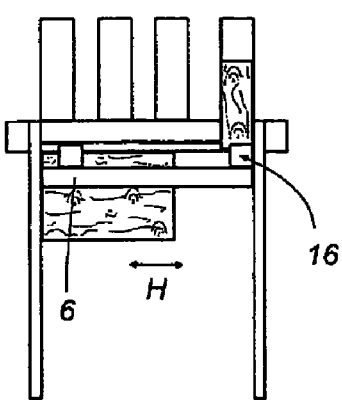
Figure 4P:
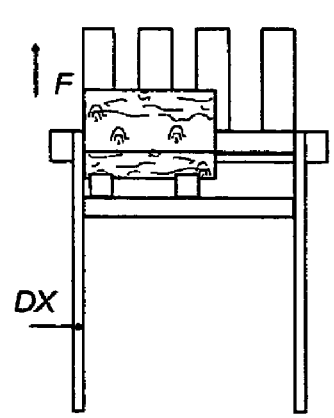
Figure 4Q:
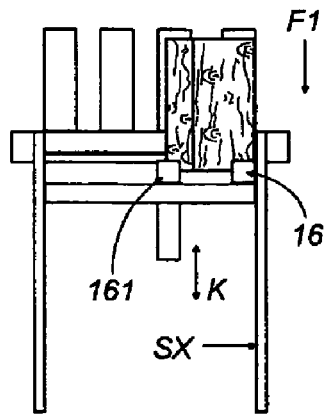
Figure 4R:
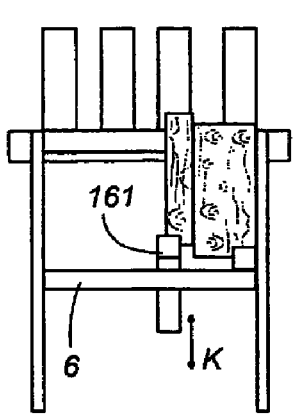

The process cycle illustrated in FIGS. 4g to 4r refers again to a panel sawing machine with a single, lengthways cutting axis and panel loading from the front, that is, from the operator side OP, but in this case having also an independent rotating device R. The grippers (see FIG. 4g) are moved into position so as to be regularly spaced out in H along the length of the panel, referenced to the right-hand zero line DX: once the grippers 16 have got hold of the panel, the pusher moves back in direction F1. In FIG. 4h, the pusher positions the panel according to a preset 0 rotation PT, the grippers 16 open, the pusher moves back a little and the grippers rise. The rotation device R (in practice a jointed gripper) now comes into operation, the device R illustrated in this example being of the linear type that moves along the axis of F1 and, in combination with a locating reference element B1 (in practice an opposing roller) rotates the panel through 90° (see FIG. 4i). During the combined movement of the rotation device R and of the reference element B1, the pusher and the gripper move to a new position that will enable them to catch hold of the short side of the panel. The pusher moves forward (see FIG. 4j), the grippers hold the panel by its short side and the pusher positions the panel first for trimming and then for the pre-cut (or pre-cuts, see FIG. 4k), after which the gripper 162 rises (see FIG. 4l), while the outer right-hand gripper 16 and the pusher move to the left-hand zero position SX to be able to catch hold of and pull the pre-cut board (or boards) in direction F1. In the meantime, the rotation device R moving in direction F and the locating reference element B1 are free to rotate the panel again. Continuing the cycle, the pusher (see FIG. 4m), with the gripper 16 located at the left-hand zero line SX, nulls the pre-cut board back in direction F1, past the cutting line and then (see FIG. 4n) forward again in direction F to be cut crossways where required. When all the crossways cuts have been completed, the gripper 16 used up to now (see FIG. 4o) also moves in H to a position where it can catch hold of the main portion of the panel previously rotated. When all the elements are in the correct position, the pusher proceeds in direction F to allow the lengthways cuts to be made where required (see FIG. 4p) with reference to the right-hand zero line DX, the various different boards reaching the air-cushion table at the end, after which the grippers and the pusher move to the pickup position referenced to the opposite, left-hand side SX again. Notice, in FIG. 4q, that the grippers have moved crossways in H to the position from which they can catch hold of the boards to pull them back past the cutting line. Finally, as shown in FIG. 4r, the pusher moves forward, while the specially equipped gripper 161 moves forward or back along the axis K to permit the crossways cuts to be made along cutting lines that are at different distances from the ends of the panels.

The process cycle illustrated in FIGS. 4s to 4d1 again refers to a panel sawing machine with a single, lengthways cutting axis but in this case with a loader (or loading platform), labelled CA, located on the side opposite the air-cushion table 50. In FIG. 4s, the whole panel is placed upstream of the panel saw and is then (see FIG. 4t) transferred in direction F and aligned with the 0 PT both lengthways and crossways by the rotation device R (optional) and the reference element B1. Next, (see FIG. 4u) the grippers rise in direction Z and the pusher is positioned in direction F1 to wait for the panel which is being rotated. The grippers, referenced to the right-hand zero line DX (see FIG. 4v) stop the panel after it has been rotated and the pusher moves forward in direction F (see FIG. 4w) to make one or more cuts, after which the panels are rotated on the air-cushion table. The grippers not used at this stage are the one labelled 162, which rises in direction Z (see FIG. 4x) and the one labelled 16 which will be used for the subsequent cutting of the boards moves in H with reference to the left-hand zero SX. In FIG. 4y, the panel is rotated again and, at the same time, the pusher moves back in direction F1 with reference to the left-hand zero SX, taking the pre-cut board past the cutting line. The pusher then moves forward again (see FIG. 4z) in steps to position the board so that it can be cut crossways at T10. In FIG. 4a1, the pusher and the grippers move (in directions F and H, respectively) to catch hold of the main portion of the panel referenced to the right-hand zero DX and make the lengthways cuts T11. Next (see FIG. 4b1), the boards cut in this way are rotated by the operator through 90° on the air-cushion table while the pusher and the grippers move back to the left-hand reference zone SX to catch hold of the boards. Lastly (see FIGS. 4c1 and 4d1)

the pusher moves back to carry the boards past the cutting line and then forward in direction F again to position them for the crossways cuts not before the gripper 161 has moved along K to allow the two (or more) boards to be cut at the same time into different lengths relative to the pusher 6.

FIGS. 5a to 5u illustrate an angular panel sawing machine, that is, having two cutting axes, labelled 7 and 7a, at right angles to each other, the former called lengthways cutting axis and the latter, crossways cutting axis. The lengthways section of the machine has a pusher 6, with grippers 16, loading table CA, zero reference line SX (referred to as being on the left since the feed directions of the panel make an angle that coincides with the machine angle, which is on the left-hand side), and with cutting feed direction F. The crossways section of the machine has a pusher 6a, with grippers 16t and 161t, zero reference line SXt and cutting feed direction F2 (see FIG. 5a).

Figure 5J:
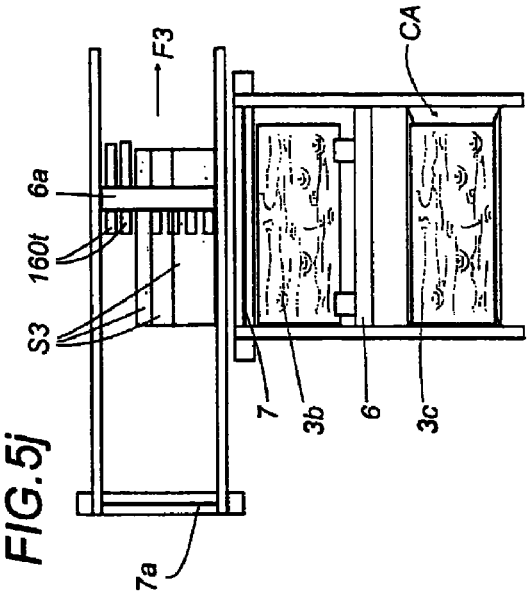
Figure 5I:
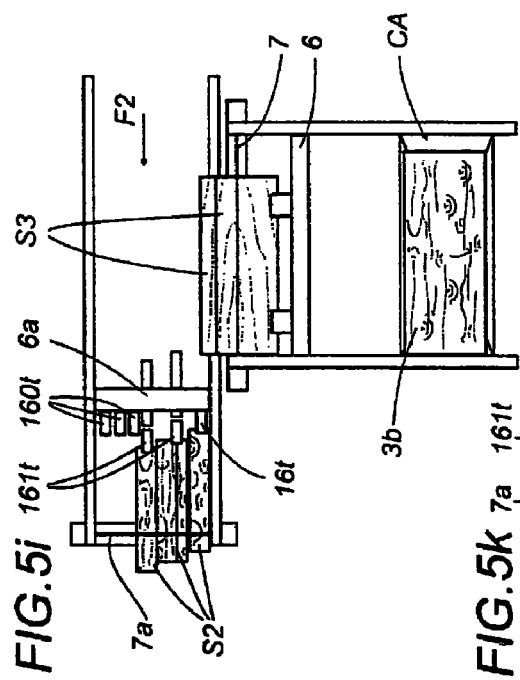
Figure 5K:
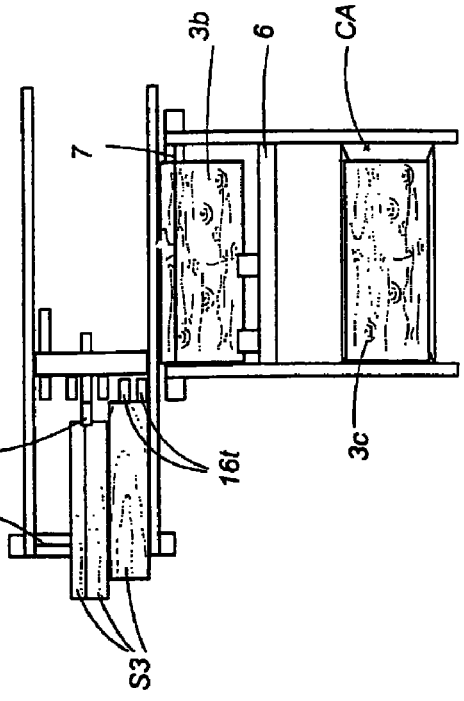

After being fed in in direction F (see FIG. 5b), the first panel or stack of panels is pushed by the pusher 6 to the 0 PT position (optional) for the rotation device R and reference element B1, while the second panel 3a is ready on the loader CA. The panel is rotated (see FIG. 5c) while the pusher 6 moves back with the grippers 162 raised in direction Z so as not to interfere with the rotation of the panel. Then (see FIG. 5d), the grippers 16 and 162 move into position in H to adapt to the length of the short side of the panel 3. The grippers 16 and 162 must therefore be able to move in directions H and Z. In the next step (see FIG. 5e), the pusher 6 moves in direction F to enable the panel to be cut into boards S1 along the axis 7. The boards S1 are then immediately gripped by the grippers 16t and 161t of the crossways section, which move in direction F2 towards the second cutting line 7a: in this configuration, the gripper 16t preferably, but not necessarily, moves in both directions H and Z, while the other grippers labelled 161t can move not only in H but also in K, all or some of them in accordance with the cutting and operating requirements of the entire machine (H and K being the directions of movement along the pusher crossbeam and perpendicular to it, respectively). In FIG. 5f, while the crossbeam 6a moves the boards S1 into position and the gripper 161t moves in direction K relative to it so as to be able to cut the boards into different lengths according to requirements, the remaining portion of the panel 3 is rotated again with the crossbeam 6 retracted and the related grippers 16 raised in direction Z. FIG. 5g shows the boards S1 after they have been positioned by the crossbeam 6a, while the pusher 6 moves the panel 3 forward in direction F again for a further cut 7 into boards S2 (see also FIG. 5h). In this case, four boards S2 are shown and therefore (as can be seen better in FIG. 5i), one gripper 16t and two grippers 161t are used. The latter are the grippers that position the boards for the crossways cut into different lengths (notice also that one of the grippers 161t is holding two boards at the same time), while the grippers that are not used—which this time are those labelled 160t—are positioned at the end of the crossbeam 6a, outside the range of the cutting stroke of the axis 7a. With reference to FIG. 5h again, the crossbeam 6a is shown during its return in direction F3 without the load. In this case, the grippers 16t, which vertically "cover" the area occupied by the boards S2, rise in direction Z so as not to interfere with the boards below, while the remaining grippers 160t, which are idle, are positioned on one side. The number of grippers 160t (and 16t) used and the length of the crossbeam 6a, are calculated in accordance with the working width L5 and the width of the overtravel L6. Similarly, the crossbeam 6 moves into position to catch hold of the next panel or stack of panels 3a which is illustrated in a lighter shade of grey. As mentioned above, FIG. 5i shows that the four boards S2 are held by one gripper 16t, which moves in H and by two grippers 161t, which move in H and K, at least one of these being able to hold two or more boards at the same time, and that there are three grippers 160t lying idle on one side of the crossbeam 6a. FIG. 5i also shows that the panel 3a is cut lengthways at 7 so as to be further divided into boards S3 that differ in width from boards S2 since successive panels can be cut according to completely different patterns. In FIG. 5j, the crossbeam 6a is again returning in direction F3 without the load and with the grippers 16t raised above the boards S3 and the grippers 160t in the idle position on one side of the crossbeam 6a. In the meantime, the next panel 3b is being handled by the crossbeam 6. In FIG. 5k, the cutting axis 7a is already working on the boards S3, with two grippers 16t holding the first board, (the larger one) and only one gripper 161t, holding the other two boards (the thinner ones). In the meantime, panel 3b is being sawn lengthways at 7.

FIGS. 5l to 5u show a machine with two cutting axes that works in the same way as the one just described but with crossbeam 6 of the lengthways section having at least one gripper 161 that can move both in H and in K so as to be able to handle two different panels 3h, 3k placed side by side. In FIG. 5m, the two grippers 16 and 161 are pushing the panel 3h in direction F towards the cutting axis 7 which divides the panel 3h into a plurality of boards S4, the latter being then transferred to the crossbeam 6a. The crossbeam 6, now free, can pick up the other panel 3k. In FIG. 5o, while the boards S4 are cut at right angles to the final axis 7a, the panel 3k cut lengthways into boards S5. In the meantime, other panels 3m, 3n have been fed into the machine. In FIG. 5p, while the boards S5 are cut crossways, the panel 3m is turned through 90° on the table of the lengthways section of the machine. In FIG. 5q, the boards S5 are cut crossways into different lengths, the panel 3m is cut into boards S6 and the panel 3n is picked up by the crossbeam 6. Other panels 3p (already cut into two boards) and 3q are fed in from the loading table. Next, as shown in FIG. 5r, while the boards S6 approach the final crossways cutting line, the panel 3n is cut lengthways into boards S7 and the crossbeam 6 transfers the twin-board panel 3p to the lengthways cutting line 7. As shown in FIG. 5s, the boards S7 are cut crossways into different lengths and the panel 3p lengthways into boards of different widths at 7. Lastly, FIG. 5u shows the latter panel being fed out of the machine after being cut, while the panel 3a is being fed to the cutting line 7.

Thus, thanks to the controlled movements of one or more pickup elements 16, the machine can cut panels, even panels placed edge to edge, into boards of different lengths in a single cutting operation. This concept is clarified further by FIGS. 6a to 6f which illustrate six steps in the operating cycle of a panel sawing machine equipped with at least one pickup element 16a, closest to the reference line RF, this time on the right, which can move backwards and forwards in direction K.

With reference to FIGS. 6a to 6f, the numeral 6 indicates the movable pusher, 7 the sawing device, 7-7 the cutting axis, and 3a and 3b two panels to be cut having different widths, equal total lengths (since they are derived from the same starting panel) but cut crossways along different lines to make different sized finished parts, labelled 40 and 41, respectively. In these drawings, the dashed lines on the panels indicate the lines along which they are to be sawn. The drawings show clearly that the boards 40 and 41 differ in length: the boards 41 on the right-hand panel are shorter than the boards 40 on the left-hand panel. The higher or lower number of parts 40 or 41 for each panel can be inverted with respect to the reference line RF. FIG. 6a in particular shows that the lines along which the two panels 3a and 3b will be cut do not coincide.

The first step in the panel cutting cycle (FIG. 6a) is to drive the pusher 6 in such a way as to move the panels into position for the trimming cut. Trimming may not always be required.

For the second cut to be made in the panels (FIG. 6b), the pusher 6 is moved forward and, at the same time, the right-hand panel 3b is moved backwards relative to it by the related pickup elements 16a so as to make the cutting lines of the two panels coincide.

For the third cut (FIG. 6c), the right-hand panel is moved further back and for the fourth cut (FIG. 6d) further back again.

The fifth cutting operation (FIG. 6e) is applied only to the right-hand panel 3b and for it to be performed, the right-hand panel must be moved forward while keeping the pusher 6, and hence the left-hand panel 3a, in the same position.

The sixth and last cut (FIG. 6f) is made in the same way as the first three.

It is evident, therefore, that by appropriately combining and programming the lengthways, crossways and vertical movements of the pusher and pickup elements, it is possible to simultaneously feed two or more panels, placed side by side, to a saw which cuts them into a large number of boards differing in size (both in length and width) using a relatively small number of cutting operations and hence saving a considerable amount of time.

The object of the present invention is achieved by the fact that the pusher crossbeam or crossbeams are not simply passive operating means but form part of an automated system whose essential parts, namely, the pickup elements, adjust automatically to the size and type of pickup of the panels or boards. Indeed, each pickup element can be regarded as a prehensile robotized device which can move in a line parallel to the axis of the crossbeam, in a line perpendicular to the axis of the crossbeam and in a vertical line, all three of these controlled movements not being applied necessarily to all the pickup elements at the same time but each one to one or more of the elements independently of the others, depending on the requirements connected with machine configuration.

Another distinctive feature of the invention is the use of a rotation device that is extremely simple in construction and that works as follows:

The pusher moves the panel (or stack) to a preset position.
The grippers open.
The pusher moves back a little way.
The rotation element R grips the corner of the panel and, thanks to its jointed mounting, rotates the panel by moving lengthways in a straight line in direction F1 acting in combination with a reference element B1 that moves in a line at right angles to direction F1.
During this operation, the pusher moves to a preset position defined in terms of the panel dimensions.

If the panel has to be rotated again after the pre-cuts have been made, this is done as follows:
The pusher moves back in direction F1, while holding the panel, in such a way as to move the remaining portion of the panel to a preset position.
The grippers open.
The pusher moves back a little way.
The rotation element R grips the corner of the panel and, with its jointed mounting acting as a pivot, waits for the reference element B1 to turn the panel by pushing it in a line at right angles to the forward and reverse feed directions F, F1.
The rotation moves in direction F in synchrony with the reference element B1 to complete the 90° rotation.

The invention described can be subject to numerous modification in its constructional and application details but without thereby departing from the scope of the inventive concept as claimed below.

The invention claimed is:

1. A panel feeding and sawing machine comprising:
   a support surface;
   a panel saw device for dividing associated wood panels supported on the support surface;
   a movable device for moving associated wood panels on the support surface in a first direction toward the panel sawing device and in a second direction away from the panel, sawing device, said second direction being opposite said first direction;
   a plurality of pickup elements mounted on the movable device and each selectively operable between an opened position and a gripping position, said pickup elements adapted to selectively grip and retain associated wood panels located on the support surface when in the gripping position and adapted to release associated wood panels located on the support surface when in the opened position;
   wherein at least a first pickup element of said plurality of pickup elements is movable relative to the movable device and relative to at least one other of said plurality of pickup elements in both the first and second opposite directions when the first pickup element is in the gripping position.

2. The panel feeding machine as set forth in claim 1, wherein at least the first and also a second of said pickup elements are both movable in both the first and second directions relative to the movable device and relative to at least one other of said plurality of pickup elements while in their respective gripping positions.

3. A panel feeding and sawing machine comprising:
   a support surface;
   a panel saw device for sawing associated wood panels;
   a movable device for moving associated wood panels on the support surface in a first direction toward an associated sawing device and in a second direction away from the associated sawing device, said second direction being opposite said first direction;
   a plurality of pickup elements mounted on the movable device and each selectively operable between an opened position and a gripping position, said pickup elements adapted to selectively grip and retain associated wood panels located on the support surface when in the gripping position and adapted to release associated wood panels located on the support surface when in the opened position;
   wherein at least a first pickup element of said plurality of pickup elements is movable relative to the movable device and relative to at least one other of said plurality of pickup elements in both the first and second opposite directions when the first pickup element is in the gripping position in order to move the associated wood panels being gripped by the first pickup element relative to the support surface and relative to the movable device.

4. The panel feeding machine as set forth in claim 3, wherein at least the first and also a second of said pickup elements are both movable in both the first and second directions relative to the movable device and relative to each other while in their respective gripping positions.

* * * * *